No. 661,128. Patented Nov. 6, 1900.
R. MOSER.
ADJUSTABLE HOOF EXPANDER.
(Application filed June 23, 1899.)

(No Model.) 2 Sheets—Sheet 1.

Witnesses:
H. C. Rodgers.
M. R. Remley.

Inventor:
Robert Moser
By Higdon, Fischer & Thorpe
Attys.

No. 661,128. Patented Nov. 6, 1900.
R. MOSER.
ADJUSTABLE HOOF EXPANDER.
(Application filed June 23, 1899.)
(No Model.) 2 Sheets—Sheet 2.

Witnesses:
K. M. Imboden,
M. L. Lauge.

Inventor,
Robert Moser
By Higdon & Higdon,
Att'ys.

UNITED STATES PATENT OFFICE.

ROBERT MOSER, OF KANSAS CITY, MISSOURI, ASSIGNOR OF ONE-HALF TO JOHN G. ROMPEL, OF SAME PLACE.

ADJUSTABLE HOOF-EXPANDER.

SPECIFICATION forming part of Letters Patent No. 661,128, dated November 6, 1900.

Application filed June 23, 1899. Serial No. 721,603. (No model.)

*To all whom it may concern:*

Be it known that I, ROBERT MOSER, of Kansas City, Jackson county, Missouri, have invented certain new and useful Improvements in Adjustable Hoof-Restorers, of which the following is a specification.

My invention relates to improvements in hoof-expanders for horses, my object being to provide a device whereby the unnaturally-contracted heel of a horse's hoof may be checked in its tendency to grow inward and gradually forced outward from the frog until ultimately the hoof shall be restored to its natural shape.

My invention relates especially to novel means of attaching the spring-arms or expander proper to the hoof and supporting the same in position thereon.

Figure 3:
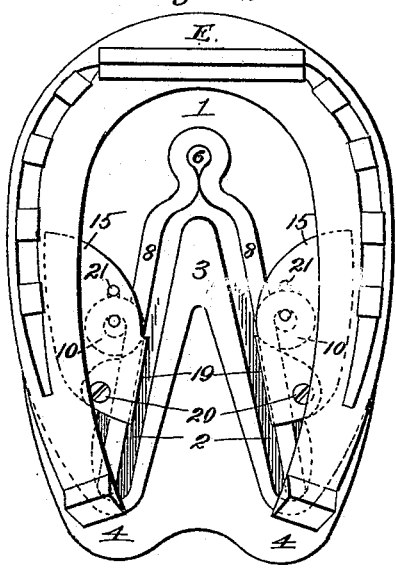
Figure 1:
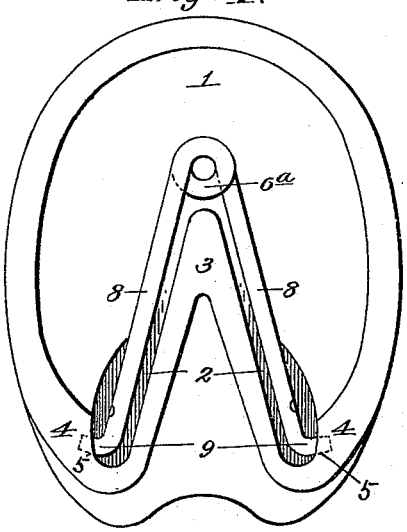
Figure 2:
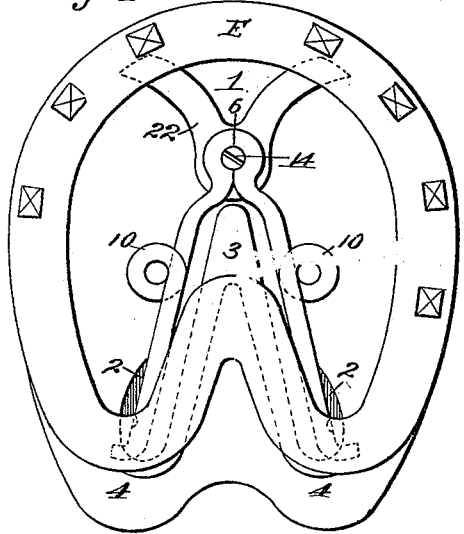
Figure 5:
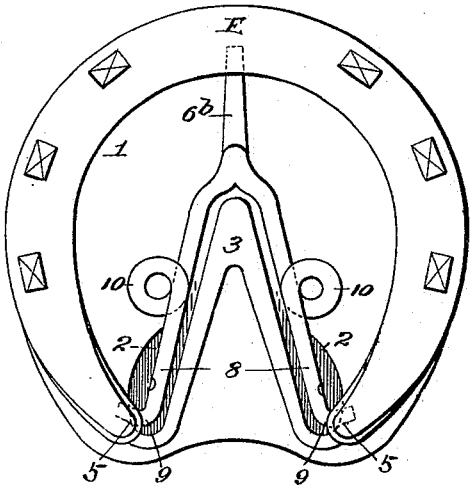
Figure 4:
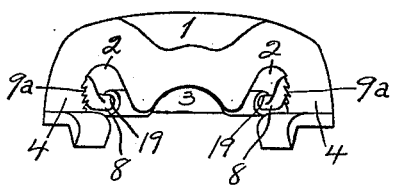
Figure 6:
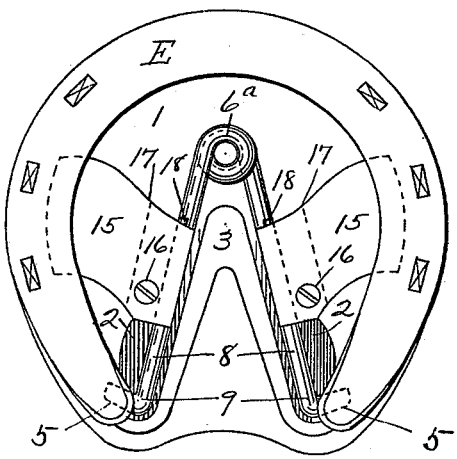

In the accompanying drawings, Figure 1 is a view of the bottom of a horse's hoof, showing one form of my expander applied thereto. Fig. 2 is a similar view showing the preferred form of my invention in use in connection with a bar-shoe. Fig. 3 is a similar view showing different means of supporting the expander on the hoof, also a different form of heel attachment. Fig. 4 is a rear view of what is shown in Fig. 3. Fig. 5 shows another form of the expander. Fig. 6 is a modification of Fig. 3.

In said drawings, 1 designates the hoof, and 2 the groove or channel between the frog 3 and the sides of the heel 4.

5 designates recesses or cavities formed at the rear end and in each of the outer sides of the grooves 2 to receive the points of the expanding-spring. Said spring appears in its simplest form in Fig. 1, where it consists of an angular spring formed with a loop or coil 6$^a$ at its apex, with two spring-arms 8 extending toward the heel and terminating in outwardly-extending hooks 9, which engage the cavities 5. If preferred, each of the spring-arms 8 may be provided about midway of its length with a coil 10 for greater resiliency. The spring-arms when adjusted on the hoof act in a well-known manner, exerting a strong and continuous pressure upon the sides of the heel to which they are applied, which pressure prevents the frog from being crowded by a contracting heel by forcing the latter outwardly, and this effect continues as long as the spreader is kept on the hoof, the device accommodating itself without any material diminution in its pressure to the hoof as it spreads.

Fig. 1 shows the expander without any special means of support for the forward end of the spring, this type of expander being for hospital use—that is, for sick horses not in service—and in such case the forward end of the expander is usually supported by a bandage or other preferred means. For use on horses in service I have devised an improved means of supporting the front end of the angular expanding-spring, my preferred form being illustrated in Fig. 2. The spring is formed with a threaded loop or eye 6 at the angle, to which is rigidly secured, by a bolt or screw 14 on the upper side of the spring or toward the hoof, a V-shaped fork or yoke 22, the two arms of which extend outwardly between the shoe E and the hoof, so that their ends rest upon the former. This fork is made quite thin and of soft steel, so that said arms may readily be bent in any direction to accommodate themselves to hoofs or shoes of any size or form, and any excess in length over what is needed is to be clipped off.

Fig. 5 shows a modification of Fig. 2, a single extension 6$^b$ integral with the spring being substituted for the yoke 22.

In Fig. 3 I show another method of supporting the spring consisting of thin flat plates 15, rigidly secured to the arms 8 and with their free edges extending outwardly between the shoe and hoof. In this instance the plates 15 are formed with extensions 19, which are bent up around the arms 8 and back between the body of the plates and the sole of the hoof, being secured to the hoof by screws 20. The plates may be further secured to the arms by staples 21, extending up from said plates and embracing the coils 10 of the arms.

Fig. 6 shows a different manner of securing the plates on the arms 8 by means of screws 16, extending up through said plates and engaging short metallic bars 17, interposed between the plates and the sole of the hoof and provided with flanges 18, slightly overlapping the arms 8.

Fig. 4 is a rear view of what is shown in Fig. 3 and shows a new method of attaching the ends of the spring-arms 8 to the insides of the heel, which consists in turning the ends of the arms 8 upwardly instead of outwardly and forming on the outer surfaces of such upturned ends a series of serrations or barbs 9ª, which under the pressure of the spring embed themselves slightly in the shell of the heel, and thus retain the rear end of the expander in position. It is obvious that these barbed terminals may be substituted for the hooked ends in any of the forms of the expanding-spring shown in the drawings.

Having described my improvements, what I claim as new, and desire to secure by Letters Patent, is—

1. A hoof-expander consisting of a pair of diverging spring-arms, suitably supported on the front portion of the hoof and extending rearwardly upon each side the frog to terminals formed by turning up the ends of said arms and forming serrations or barbs in the outer surfaces of such upturned ends, substantially as set forth.

2. A hoof-expander consisting of a pair of diverging spring-arms, formed with a loop or eye at their angle of intersection, terminals at the ends of said arms adapted to engage the rear portion of a hoof, and with a V-shaped fork secured in said loop and having its prongs extending forwardly and adapted to engage seats between the forward portions of the hoof and shoe, substantially as set forth.

3. In a hoof-expander of the type described, a pair of outwardly-extending wings or plates, each rigidly secured on one of the spring-arms, with its free edge adapted to be interposed between the hoof and shoe, substantially as set forth.

In testimony whereof I affix my signature in the presence of two witnesses.

ROBERT MOSER.

Witnesses:
M. R. REMLEY,
H. C. RODGERS.

53,585, Monohan, Hoof & Shoe Spreaders -
19,667, Harris,              "
46,471, Roberge,             "
97,629, Chadwick,            "